2,724,470

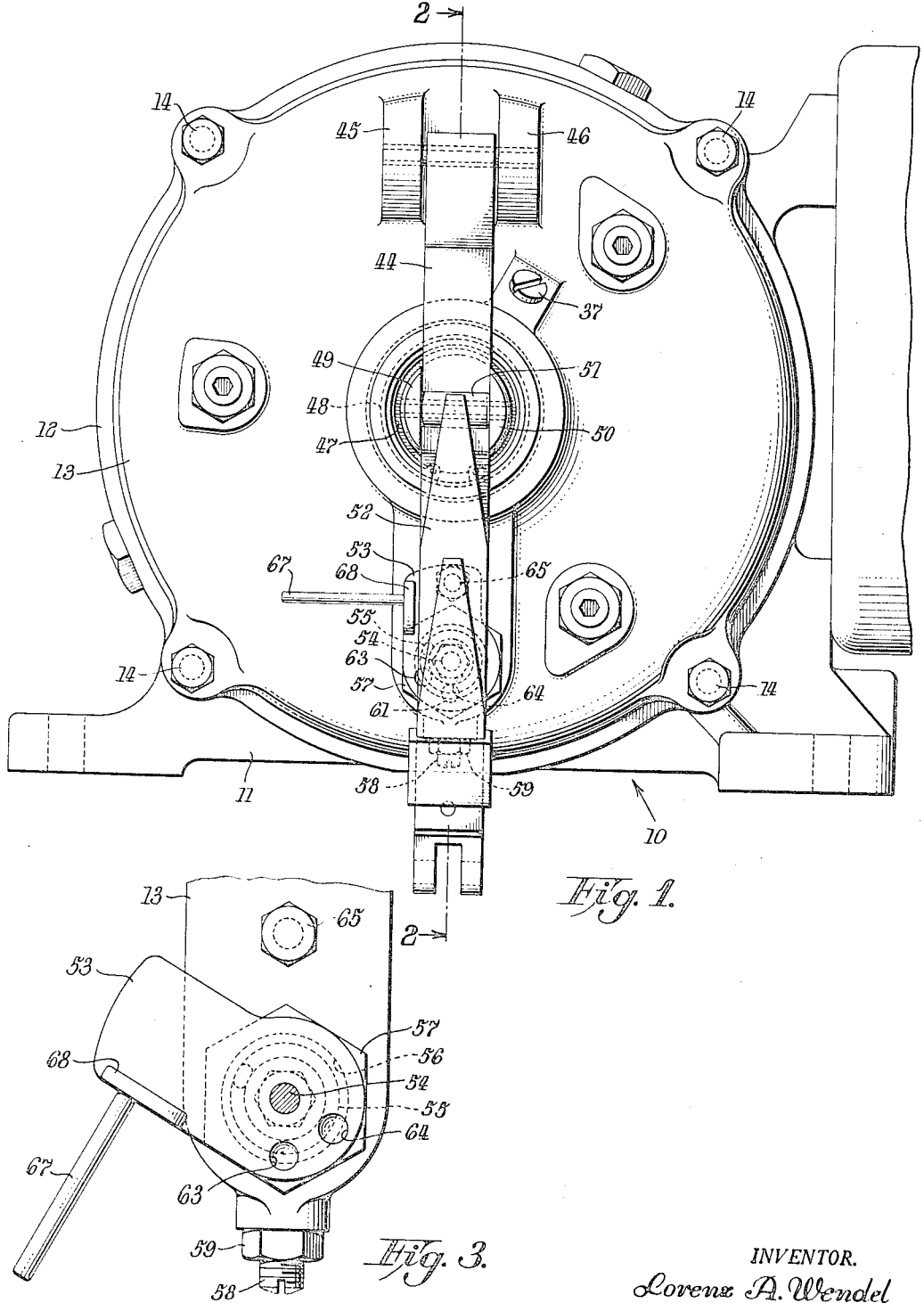

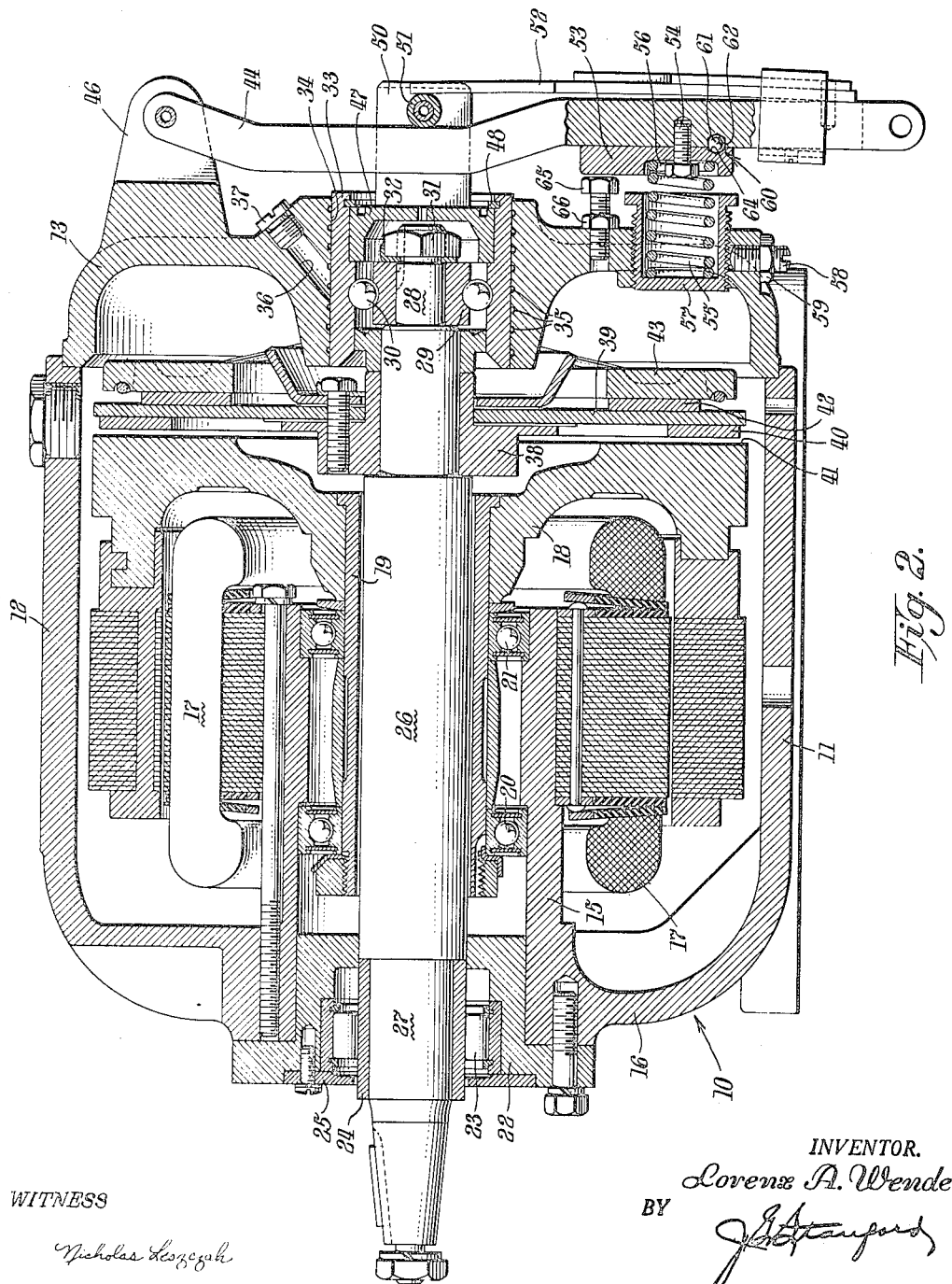

ELECTRIC CLUTCH-BRAKE MOTORS

Lorenz A. Wendel, Somerville, N. J., assignor to The Singer Manufacturing Company, Elizabeth, N. J., a corporation of New Jersey Application December 12, 1952, Serial No. 325,584

7 Claims. (Cl. 192—18)

This invention relates to electric clutch-brake motors or power transmitters connected to a heavy load which must be repeatedly started and stopped. The invention relates more specifically to means for controlling the operation of the transmitter and to means for preventing accidental engagement of the transmitter clutch.

An object of the invention is to provide a safety device for preventing accidental rotation of the driven shaft of the electric power transmitter.

Another object of the invention is to provide means for adjusting the brake-engaging force applied to the transmitter brake.

A further object of the invention is to provide means for adjusting the safety device to assure sufficient clearance of the transmitter clutch to prevent clutch engagement.

In the drawings, Fig. 1 is an end view in elevation of a transmitter embodying the invention and showing the safety device in its operative position.

Fig. 2 is a sectional view taken substantially on line 2—2 of Fig. 1.

Fig. 3 is a right end view of the safety device shown in its inoperative position.

Referring more specifically to the drawings, an electric power transmitter or clutch-brake motor 10 is shown provided with a frame 11 which comprises a casing 12 and end closure bell 13 which is secured to the casing 12 by four bolts 14. A cylindrical support sleeve 15 extends from an end closure portion 16 of the casing 12 and carries a motor stator 17. A rotor 18 is secured to a sleeve shaft 19 which is journaled in two axially spaced ball bearings 20 and 21 secured in the support sleeve 15. The end closure portion 16 carries a bearing cap 22 which supports a roller bearing 23, the inner race 24 of which can be moved axially relative to the roller elements. A closure ring 25 secured to the cap 22 holds the bearing 23 in place in the cap 22. A driven shaft 26 is provided with a reduced diameter portion 27 which is pressed into the inner race 24 of the roller bearing 23 and is supported thereby for rotary and axial motion. The other end of the shaft 26 is provided with a reduced diameter portion 28 which is fitted into the inner race 29 of a control ball bearing 30. The bearing 30 is fixed against axial motion relative to the shaft 26 by a nut 31 which is threaded onto the shaft and held in place by a lockwasher 32. A sliding sleeve 33 forms the outer race of the bearing 30. The sleeve 33 is carefully fitted into a central opening 34 formed in the end closure bell 13. Lubricating grooves 35 are formed in the cylindrical surface of the opening 34 to permit lubricant to reach the sliding surfaces. Lubricant is fed to the grooves 35 from a supply passage 36 formed in the closure bell 13 and capped by a grease fitting 37. A hub 38 is shrink fitted on the shaft 26 and carries a clutch-brake plate 39. A clutch facing 40 on one side of the plate 39 is engageable with a clutch surface 41 on the rotor 18 and a brake facing 42 on the other side of the plate 39 is engageable with a brake 43 carried by the frame 11. The particular brake may be of any well known type such as that shown in the Turner et al. Patent No. 2,510,917, dated June 6, 1950.

The control mechanism comprises a control lever 44 pivotally supported by two bosses 45 and 46 formed on the end closure bell 13. A control cap 47 is secured in a counterbore in the sleeve 33 by a spring ring 48 and is provided with two axially extending ears 49 and 50 which carry a roll pin 51. The lever 44 passes between the body of the cap 47 and the roll pin 51 and carries a leaf spring 52 which is clamped to the lever 44 and engages the roll pin 51 approximately diametrically opposite to the lever 44. The lower end of the lever 44 carries a stop lug 53 which is loosely fastened to the lever 44 by a pivot screw 54. One end of a brake engaging spring 55 is seated in a counterbore 56 formed in the lug 53 concentric with the screw 54 and the other end of the spring 55 is seated in a socket 57 which is threaded into the end closure bell 13. The compression of the spring 55 can be adjusted by turning the threaded socket 57 to move it into or out of the frame 11. A set screw 58 and lock nut 59 hold the socket 57 in the desired adjusted position. The spring 55 holds the lug 53 firmly against the lever 44 and a ball detent 60 between the lug 53 and the lever 44. The ball detent 60 comprises a ball 61 seated in a detent socket 62 formed in the lever 44 and engageable with either of two detent holes 63 and 64 formed in the stop lug 53. When the stop lug 53 is in the position shown in Fig. 1, it is engageable with a stop screw 65 adjustably threaded into the end closure bell 13 and held in position by a lock nut 66. A pin 67 protrudes from a limit member 68 formed on one side of the lug 53 and functions as an operating lever for the stop lug. When the lug 53 is moved to the position shown in Fig. 3 with the detent ball engaging the detent hole 63, the stop lug 53 cannot engage the stop screw 65 and the clutch can be engaged. The limit member 68 is engageable with the lever 44 to prevent over-travel of the lug 53 in a clockwise direction as viewed in Fig. 1.

From the above description, it is believed that the operation and advantages of the device will be readily understood. The drive shaft 26 is connected to a driven machine (not shown) through suitable driving connections. The rotor 18 is normally rotating when the motor is energized and functions as a source of power to drive the driven shaft 26. When the driven shaft 26 is at rest, the parts of the transmitter are in substantially the position shown in Fig. 2, with the shaft 26 drawn to the right by the force of the spring 55 to engage the brake elements 42 and 43. Assuming that the stop lug 53 is in the position shown in Fig. 3, the stop lug cannot engage the screw 65 and the lever 44 can be moved to the left as viewed in Fig. 2. When it is desired to rotate the driven shaft 26 under power, the lower end of the lever 44 is moved to the left, as viewed in Fig. 2 against the force of the spring 55. As the lever 44 moves to the left, the leaf spring 52 forces the control cap 47 and the driven shaft 26 to the left to disengage the brake elements 42 and 43 and engage the clutch elements 40 and 41. Of course, when the lever 44 is released, the spring 55 causes the clutch to disengage and the brake to engage.

In the course of normal operation, it is frequently necessary to adjust or repair the driven machine (not shown) which is driven by the shaft 26. Much of the necessary work normally can be done without disconnecting the transmitter 10. However, unless some precaution is taken to prevent engagement of the clutch elements 40 and 41, there is a possibility that the clutch elements 40 and 41 may be accidentally engaged while the rotor 18 is turning, resulting in possible damage to the driven machine or injury to the mechanic. The stop lug 53 and stop screw 65 prevent the clutch from being accidentally engaged. When it is desired to do service work on the mechanism, the stop lug 53 is placed in the position shown in Fig. 1, with the detent ball 61 engaging the hole 64. When correctly adjusted, the stop screw 65 permits the lever 44 to move just far enough to disengage the brake elements 42 and 43 before the lug 53 strikes the stop screw 65 but not far enough to engage the clutch elements 40 and 41. Thus, the lever 44 can be moved enough to release the brake and place the plate 39 in a neutral position, permitting the driven shaft 26 to be turned by hand, but the lever cannot be moved far enough to engage the clutch elements 40 and 41 to drive the shaft 26 under power.

The brake engaging force of the spring 55 is varied by loosening the set screw 58 and lock nut 59 and turning the socket 55 to increase or decrease the compression of the spring 55. After the adjustment is made, the screw 58 and the lock nut 59 are retightened to hold the socket 57 in place. Obviously, as the compression of the spring 55 is changed, the "stiffness" of the detent 60 is also changed.

From the above description, it is believed to be apparent that I have provided an electric power transmitter with a compact and efficient safety device which permits the transmitter and any mechanism driven thereby to be readily and safely serviced. Further, the interrelated action of the brake spring with the safety detent device provides a simple and easy means for adjusting the action of the brake and the detent action of the safety device.

Having thus set forth the nature of the invention, what I claim herein is:

1. An electric power transmitter comprising a frame, a stator carried by said frame, a rotor rotatably supported by said frame, a driven shaft carried by said frame and adapted to be rotated by said rotor, a clutch for operatively connecting said driven shaft to said rotor, a brake for said driven shaft, actuating means for said clutch and brake, stop means coacting with said actuating means for said clutch and brake to prevent engagement of said clutch, spring means coacting with said stop means and said actuating means to urge said brake into engagement, and means for rendering said stop means ineffective.

2. An electric power transmitter comprising a frame, a stator carried by said frame, a rotor rotatably supported by said frame, a driven shaft carried by said frame, and adapted to be rotated by said rotor, a clutch for operatively connecting said driven shaft to said rotor, an actuating lever pivotally carried by said frame and adapted to operate said clutch, a stop lug carried by said lever, means for moving said lug relative to said lever from an operative position to an inoperative position, a stop carried by said frame and engageable by said stop lug in its operative position, and a clutch disengaging spring interposed between said frame and said stop lug.

3. An electric power transmitter comprising a frame, a stator carried by said frame, a rotor rotatably supported by said frame, a driven shaft carried by said frame and adapted to be rotated by said rotor, a clutch for operatively connecting said driven shaft to said rotor, means for actuating said clutch including a lever operatively connected to said clutch and pivotally carried by said frame, a stop member carried by said frame, a movable stop lug carried by said lever and engageable with said stop member, a spring disposed between said frame and said stop lug, and detent means between said lug and said lever to yieldingly hold said lug in a selected position.

4. An electric power transmitter comprising a frame, a stator carried by said frame, a rotor concentric with said stator and rotatably carried by said frame, a driven shaft rotatably carried by said frame, said shaft being movable axially, a clutch member carried by said rotor, a brake member carried by said frame, a clutch-brake element disposed between said members and fastened to said driven shaft, a lever fulcrumed on said frame and operatively connected to said driven shaft to move said shaft axially, a stop lug pivotally fastened to said lever, a brake engaging spring carried by said frame and engaging said stop lug, and stop means carried by said frame and engageable by said stop lug.

5. An electric power transmitter comprising a frame, a stator carried by said frame, a rotor rotatably carried by said frame, a driven shaft carried by said frame and adapted to be rotated by said rotor, a clutch for operatively connecting said driven shaft to said rotor, an actuating lever carried by said frame and operatively connected to said clutch, a stop member carried by said frame, a stop lug pivotally fastened to said lever and engageable with said stop member, a detent between said lug and said lever, an adjustable spring socket carried by said frame, and a clutch disengaging spring disposed between and engaging said socket and said lug.

6. An electric power transmitter comprising a frame member, a rotor rotatably supported by said frame member, a driven shaft carried by said frame member and adapted to be rotated by said rotor, a clutch for operatively connecting said driven shaft to said rotor, means for operating said clutch including an actuating member operatively connected to said clutch and pivotally carried by said frame member, a stop element carried by one of said members, a movable stop lug carried by the other of said members and engageable with said stop element, and a spring disposed between said lug and said one of said members.

7. An electric power transmitter having a frame member, a stator carried by said frame member, a rotor supported by said frame member for rotation, a driven shaft carried by said frame member concentric with said rotor, a clutch for operatively connecting said driven shaft to said rotor, said clutch including a driven element fixed against angular movement relative to said driven shaft, a movable actuating member mounted on said frame for engaging and disengaging said clutch, means operatively connecting said actuating member to said clutch driven member for actuating said clutch, a stop carried by one of said members, a stop lug carried by the other of said members for movement relative thereto, said lug having an effective and ineffective position, and said lug being engageable in its effective position with said stop when said actuating member is moved to engage said clutch.

References Cited in the file of this patent

UNITED STATES PATENTS 2,006,913   Conley ----------------- July 2, 1935